United States Patent
Brauner

(10) Patent No.: US 7,090,905 B1
(45) Date of Patent: Aug. 15, 2006

(54) FLAT OR SEMI-FLAT ELEMENT INCLUDING A FRAME

(75) Inventor: Manfred Brauner, Vienna (AT)

(73) Assignee: Arca Systems International AB, Perstorp (SE)

( * ) Notice: Subject to any disclaimer, the term of this patent is extended or adjusted under 35 U.S.C. 154(b) by 0 days.

(21) Appl. No.: 09/554,269

(22) PCT Filed: Nov. 4, 1998

(86) PCT No.: PCT/SE98/01997

§ 371 (c)(1),
(2), (4) Date: Jun. 29, 2000

(87) PCT Pub. No.: WO99/25532

PCT Pub. Date: May 27, 1999

(30) Foreign Application Priority Data

Nov. 13, 1997 (SE) .................................. 9704153

(51) Int. Cl.
*B29D 22/00* (2006.01)
*B29D 23/00* (2006.01)
*B32B 1/08* (2006.01)

(52) U.S. Cl. ...................... 428/35.7; 428/12; 428/34.9; 220/4.28; 220/644; 220/649; 220/657; 220/659; 220/6; 160/377

(58) Field of Classification Search ............... 428/34.1, 428/34.9, 35.7, 12; 220/4.01, 4.28, 6, 641–649, 220/656–659, 669, 675, 666, 600, 607, 610, 220/608, 623; 264/572; 160/369, 377; D25/119; 425/542, 546, 555, 562
See application file for complete search history.

(56) References Cited

U.S. PATENT DOCUMENTS

| 2,189,521 | A | * | 2/1940 | King ............................ 40/152 |
| 2,880,902 | A | * | 4/1959 | Owsen ........................... 220/8 |
| 2,888,764 | A | * | 6/1959 | Knox ........................... 40/152 |
| 3,565,278 | A | * | 2/1971 | Rehrig ......................... 220/21 |
| 3,634,182 | A | * | 1/1972 | Biglin .......................... 161/42 |
| 3,816,181 | A | * | 6/1974 | Buckethal .................... 429/160 |
| 3,907,193 | A | * | 9/1975 | Heller ......................... 428/156 |
| 4,201,295 | A | * | 5/1980 | Morcom ..................... 206/174 |
| 4,430,370 | A | * | 2/1984 | Gallagher ................ 428/36.92 |
| 5,395,010 | A | * | 3/1995 | Umiker ...................... 220/771 |
| 5,476,705 | A | * | 12/1995 | Mizuse et al. .............. 428/119 |
| 6,216,377 | B1 | * | 4/2001 | Painsith ....................... 40/750 |

FOREIGN PATENT DOCUMENTS

WO    WO 97/16353    * 5/1997
WO    WO 97/39954    * 10/1997

OTHER PUBLICATIONS

Patent Abstracts of Japan, abstract of JP 82-67493 A, Oct. 15, 1996.
Patent Abstracts of Japan, abstract of JP 4-164609 A, Jun. 10, 1992.
Patent Abstracts of Japan, abstract of JP 4-284214 A, Oct. 8, 1992.

* cited by examiner

*Primary Examiner*—Michael Miggins
(74) *Attorney, Agent, or Firm*—Stevens, Davis, Miller & Mosher, L.L.P.

(57) ABSTRACT

Flat or semi-flat element (1) including a partly or completely circumambient frame (2), which element (1) is manufactured through molding of a polymeric material. The element (1) includes a carrying structure, constituted by the frame (2), and an intermediate wall section (3). The wall section (3) is connected to the frame (2) via a resilient section (4), the resilient section (4) being a part of the wall section (3). The differences in the temperature related shrinkage between the frame (2) and the wall section (3) is absorbed by the resilient section (4), whereby warping of the element (1) is avoided.

20 Claims, 2 Drawing Sheets

FLAT OR SEMI-FLAT ELEMENT INCLUDING A FRAME

BACKGROUND OF THE INVENTION

1. Field of the Invention

The present invention relates to a flat or a semi-flat element including a partly or completely circumambient frame and an intermediate wall section.

2. Description of Related Art

Products made of plastic material are seen almost everywhere today. One way of manufacturing these products is through injection moulding of a thermoplastic material. It is a well known fact that the material thickness in such injection moulded products may not differ too much within the product since problems with warping will otherwise occur. This warping is caused by the temperature related shrinking, which is relatively great in most thermoplastic materials. An injection moulded product will normally be removed from the mould before it is completely cooled since the cycle time is an important economical factor in plastic manufacturing. The remainder of the cooling will hereby take place outside the mould. The shrinkage is related to the temperature which means that a part removed from the mould when hot will shrink more than a part removed when cold since some of the natural shrinkage can be counteracted by "freezing" the shape of the part in the mould. This means that thicker parts, which naturally contains more heat than thinner parts in the same product, will continue to shrink when cooling outside the mould. This will inevitably cause warping in the product. This problem has so far been prevented by designing the products with uniform material thickness.

There are however some cases where it would have been an advantage to be able to design products with different material thicknesses. One such example is containers where the walls and the bottom does not have to be particularly strong and the carrying structure of the container has to be strong since a lot of containers are to be stacked on top of each other, adding load to the container in the bottom of the stack. The thickness of the side walls and the bottom will in this case have to be over-dimensioned to be adapted to the injection moulding process since the carrying structure has to be sturdy. This will lead to a container heavier than necessary and that more material than necessary is used. This will of cause lead to an uneconomical product.

SUMMARY OF THE INVENTION

According to the present invention it is possible to manufacture a product where the above mentioned disadvantages are avoided. The invention relates to a flat or semi-flat element including a partly or completely circumambient frame. The element is manufactured through moulding of a polymeric material, preferably injection moulding of a thermoplastic material. The invention is characterised in that the element includes a carrying structure, constituted by the frame, and an intermediate wall section. The wall section is connected to the frame via a resilient section which is a part of the wall section. The differences in the temperature related shrinkage between the frame and the wall section is hereby absorbed by the resilient section whereby warping of the element is avoided. The frame is preferably constituted by a U-shaped profile, a number of tightly placed ribs, a closed hollow profile or the like. The wall section is suitably connected to the frame at or at least near to to the gravity centre line of the frame.

According to one embodiment of the invention the frame is a closed hollow profile formed through injection of a pressurised fluid into a still molten thermoplastic material. The material thickness of the wall section is thinner closest to the connection between the frame and the wall section than the average thickness of the wall section and the frame, whereby a barrier is formed in this connection part at the solidification of the thermoplastic material. The barrier prevents the pressurised fluid from entering the wall section during the manufacturing process. The hollow profiles can suitably be achieved by substantially filling the mould with molten thermoplastic material from an injection nozzle. The molten thermoplastic material is then allowed to solidify somewhat on the surface closest to the inner walls of the mould cavity. A pressurised fluid, preferably a gas, is thereafter injected through an intake suitably placed at one end of the profile. The gas is allowed to flow into the still molten plastic in the core of the profile wherein a cavity is formed in the profile. The surplus of still molten plastic is hereby ejected from of the mould cavity. An element of this type can suitably be made from a thermoplastic material selected from the group, polyethylene, polypropylene, polyamide, polystyrene, acryl-butadiene-styrene, polyalkylene-terephthalate or the like.

The material thickness of the wall section is suitably thinner closest to the connection between the frame and the wall section than the average thickness of the wall section and the frame, whereby a pivot line is formed. The pivot line will facilitate resilient action in the wall section.

The element suitably forms a side wall of a container or a collapsible container, a bottom section of a container or a collapsible container or a lid of a container or the like.

The invention is explained further together with enclosed drawings, showing different embodiments of the invention wherein,

DETAILED DESCRIPTION OF THE INVENTION

Figure 1:
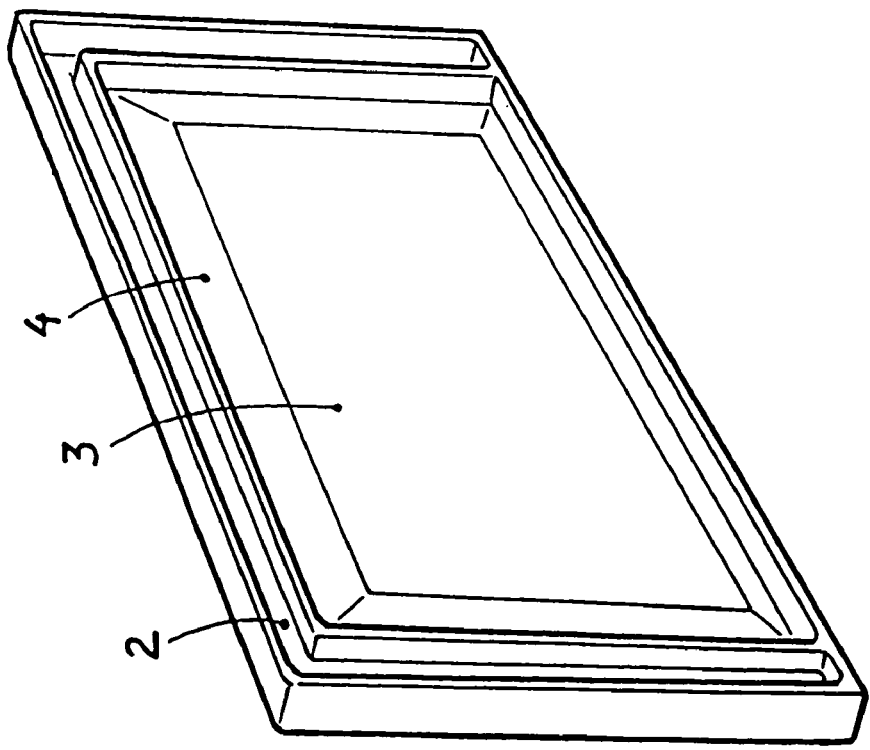
FIG. 1 shows, in perspective a first embodiment of an element 1 with a frame 2 and an intermediate wall section 3.

FIG. 1 shows, in perspective one embodiment of an element 1 with a frame 2 and an intermediate wall section 3. The element 1 includes a carrying structure constituted by the frame 2, and an intermediate wall section 3. The wall section 3 is connected to the frame 2 via a resilient section 4. The resilient section 4 is a part of the wall section 3. Differences in the temperature related shrinkage between the frame 2 and the wall section 3 is absorbed by the resilient section 4 whereby warping of the element 1 is avoided.

Figure 2A:
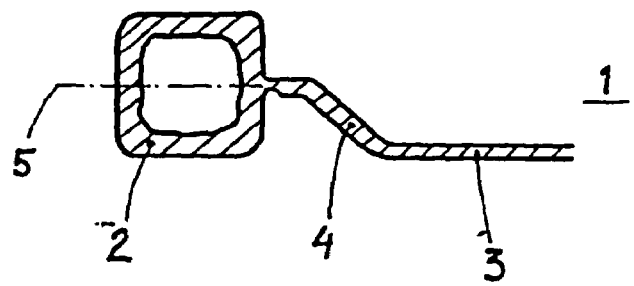
FIGS. 2a–2d show, in cross-section, parts of different embodiments of an element 1 with profiles constituting the frame 2 of the element 1
Figure 2B:
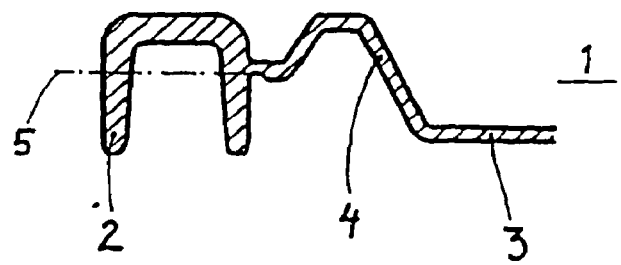
Figure 2C:
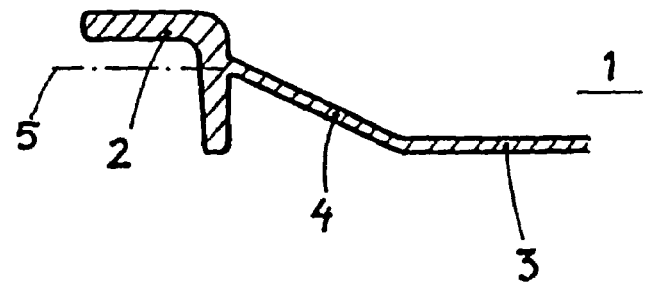
Figure 2D:
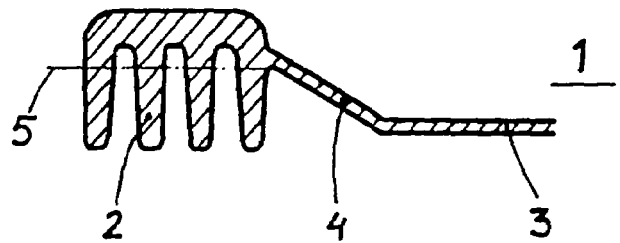

FIGS. 2a–2d show, in cross-section, parts of different embodiments of an element 1 with profiles constituting a frame 2 of the element 1. The element 1 includes a carrying structure, constituted by the frame 2, and an intermediate wall section 3. The wall section 3 is connected to the frame 2 via a resilient section 4. The resilient section 4 is a part of the wall section 3. The frame 2 is constituted by a U-shaped profile (FIG. 2b), a number of tightly placed ribs, such that the ribs are arranged at a distance from each other smaller than the height of the ribs (FIG. 2d), a closed hollow profile (FIG. 2a) or an L-shaped profile (FIG. 2c). The wall section 3 is connected to the frame 2 at or very close to the gravity centre line 5 of the frame 2. The frame 2 is constituted by a closed hollow profile (FIG. 2a) formed through injection of a pressurised fluid into a still molten thermoplastic material. The material thickness of the wall section 3 is thinner closest to the connection between the frame 2 and the wall section 3 than the average thickness of the wall section 3 and the frame 2, whereby a barrier is formed, in this connection part at the solidification of the thermoplastic material, which barrier, prevents the pressurised fluid from entering the wall section 3 during the manufacturing process. This thinner part will also act as a pivot line (FIGS. 2a–2b). The pivot line will facilitate resilient action in the wall section 3.

The intermediate wall section 3 can also be provided with a number of holes. These holes can be of different shape and size, depending on the requirements. Such holes are normally used in transport containers when ventilation is required The invention is not limited to the embodiments shown, since it can be varied in different ways within the scoop of the invention.

The invention claimed is:

1. An element, said element being flat or semi-flat and comprising a partly or completely circumambient frame, which element is manufactured through injection molding of a thermoplastic polymeric material, wherein the element comprises a carrying structure constituted by the frame, said frame having a corner section and a straight section, and a wall section, which wall section is connected to the circumambient frame via a resilient section, the resilient section being a part of the wall section, wherein differences in the temperature related shrinkage between the circumambient frame and the wall section are absorbed by the resilient section whereby the resilient section prevents warping of the element, wherein the wall section is connected to the straight section of the frame, and a material thickness of the wall section is thinner closest to the connection between the frame and the wall section than the average thickness of the wall section and the frame, wherein a pivot line is formed, which pivot line facilitates resilient action in the wall section.

2. The element according to claim 1, wherein the element forms a side wall of a container or a collapsible container, a bottom section of a container or a collapsible container or a lid of a container.

3. The element according to claim 1, wherein the element forms a side wall of a container or a collapsible container, a bottom section of a container or a collapsible container or a lid of a container.

4. The element according to claim 1, wherein the frame is formed by a plurality of ribs, the plurality of ribs spaced at a distance from each other smaller than the height of the height of each of the plurality of ribs.

5. The element according to claim 1, wherein the frame is formed by a closed hollow profile.

6. The element according to claim 1, wherein the wall section is connected to the frame, such that any disparate shrinking is absorbed by the resilient section without any relative movement between the wall section and the frame.

7. A container comprising a plurality of sidewalls and optionally a lid, at least one selected from the group consisting of at least one of the sidewalls and the lid comprising the flat or semi-flat element of claim 1.

8. The element according to claim 1, wherein the frame is formed by a U-shaped profile.

9. The element according to claim 8, wherein the wall section is connected to the frame about the gravity center line of the frame.

10. The element according to claim 9, wherein the wall section is connected to the frame at the gravity center line of the frame.

11. Flat or semi-flat element according to claim 8, further comprising a barrier in the connection part at the solidification of the thermoplastic material, which barrier prevents pressurised fluid used during the injection molding from entering the wall section during the manufacturing process.

12. The element according to claim 8, wherein the element forms a side wall of a container or a collapsible container, a bottom section of a container or a collapsible container or a lid of a container.

13. The element according to claim 1, wherein the wall section is connected to the frame about the gravity center line of the frame.

14. The element according to claim 13, further comprising a barrier in the connection part at the solidification of the thermoplastic material, which barrier prevents pressurised fluid used during the injection molding from entering the wall section during the manufacturing process.

15. The element according to claim 13, wherein the element forms a side wall of a container or a collapsible container, a bottom section of a container or a collapsible container or a lid of a container.

16. The element according to claim 13, wherein the wall section is connected to the frame at the gravity center line of the frame.

17. The element according claim 1, further comprising a barrier in the connection part at the solidification of the thermoplastic material, which barrier prevents pressurised fluid used during the injection molding from entering the wall section during the manufacturing process.

18. The element according to claim 17, wherein the element forms a side wall of a container or a collapsible container, a bottom section of a container or a collapsible container or a lid of a container.

19. The element according to claim 1, wherein the wall section and the circumambient frame have disparate thicknesses.

20. A container comprising a plurality of sidewalls and optionally a lid, at least one selected from the group consisting of at least one of the sidewalls and the lid comprising the flat or semi-flat element of claim 19.

* * * * *